(12) United States Patent
Liu et al.

(10) Patent No.: US 11,703,702 B2
(45) Date of Patent: Jul. 18, 2023

(54) PRIVACY FUNCTION STRUCTURE THAT CAN SWITCH BETWEEN A PRIVACY STATE AND A NON-PRIVACY STATE, DISPLAY PANEL, AND DISPLAY DEVICE

(71) Applicants: Mianyang HKC Optoelectronics Technology Co., Ltd., Sichuan (CN); HKC Corporation Limited, Guangdong (CN)

(72) Inventors: Yunyang Liu, Sichuan (CN); Tianyu Xia, Sichuan (CN); Haijiang Yuan, Sichuan (CN)

(73) Assignees: MIANYANG HKC OPTOELECTRONICS TECHNOLOGY CO., LTD., Sichuan (CN); HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 17/994,863

(22) Filed: Nov. 28, 2022

(65) Prior Publication Data
US 2023/0168527 A1    Jun. 1, 2023

(30) Foreign Application Priority Data
Nov. 29, 2021    (CN) .......................... 202111438234.0

(51) Int. Cl.
  G02F 1/13      (2006.01)
  G02F 1/1362    (2006.01)
  G02F 1/1334    (2006.01)
(52) U.S. Cl.
  CPC .......... G02F 1/1323 (2013.01); G02F 1/1334 (2013.01); G02F 1/136209 (2013.01)
(58) Field of Classification Search
  CPC ............. G02F 2203/62; G02F 2203/03; G02F 1/13756; G02F 1/00
  See application file for complete search history.

(56) References Cited

U.S. PATENT DOCUMENTS

| 10,606,104 B2 * | 3/2020 | Liu ......................... G02F 1/167 |
| 10,606,105 B2 * | 3/2020 | Kuo ...................... G02F 1/1323 |

(Continued)

FOREIGN PATENT DOCUMENTS

| CN | 106773373 A | 5/2017 |
| CN | 108563078 A | 9/2018 |

(Continued)

OTHER PUBLICATIONS

Chinese First Office Action dated Jun. 2, 2022 issued in CN 202111438234.0.

*Primary Examiner* — Paul C Lee
(74) *Attorney, Agent, or Firm* — Scully, Scott, Murphy & Presser, P.C.

(57) ABSTRACT

A privacy function structure, a display panel, and a display device are provided in the present disclosure. The privacy function structure includes a privacy state and a non-privacy state. The privacy function structure includes a first conductive layer, a privacy liquid crystal layer, a light-transmitting cover plate, and a second conductive layer. The privacy liquid crystal layer is disposed on a side of the first conductive layer, the light-transmitting cover plate is disposed on a side of the privacy liquid crystal layer away from the first conductive layer, and the second conductive layer is disposed on a side of the light-transmitting cover plate facing the first conductive layer. The second conductive layer includes multiple conductive strips mutually parallel. By controlling on and off of the multiple conductive strips, the privacy function structure is switched between the privacy state and the non-privacy state.

12 Claims, 8 Drawing Sheets

(56) References Cited

U.S. PATENT DOCUMENTS

| | | | | |
|---|---|---|---|---|
| 10,649,248 B1* | 5/2020 | Fan Jiang | ............... | H04N 7/141 |
| 2012/0250141 A1* | 10/2012 | Chen | ....................... | G02F 1/167 |
| | | | | 348/E13.075 |
| 2014/0226093 A1* | 8/2014 | Schwartz | .............. | G02F 1/1334 |
| | | | | 349/86 |
| 2015/0301400 A1* | 10/2015 | Kimura | .................. | H04N 13/00 |
| | | | | 349/110 |
| 2016/0357046 A1* | 12/2016 | Choi | ..................... | G02F 1/1336 |
| 2017/0219859 A1* | 8/2017 | Christophy | ................ | G02F 1/29 |
| 2018/0239214 A1* | 8/2018 | Ji | ............................ | G02F 1/293 |
| 2020/0218101 A1* | 7/2020 | Ihas | ...................... | G02F 1/0136 |

FOREIGN PATENT DOCUMENTS

| | | | | | |
|---|---|---|---|---|---|
| CN | | 112987379 A | 6/2021 | | |
| CN | | 113671734 A | 11/2021 | | |
| WO | WO-2023010610 A1 * | 2/2023 | ........... | G02F 1/1323 | |

* cited by examiner

PRIVACY FUNCTION STRUCTURE THAT CAN SWITCH BETWEEN A PRIVACY STATE AND A NON-PRIVACY STATE, DISPLAY PANEL, AND DISPLAY DEVICE

CROSS-REFERENCE TO RELATED APPLICATION(S)

This application claims priority to Chinese Patent Application No. 202111438234.0, filed Nov. 29, 2021, the entire disclosure of which is hereby incorporated by reference.

TECHNICAL FIELD

This disclosure relates to the technical field of display, and in particular, to a privacy function structure, a display panel, and a display device.

BACKGROUND

At present, as people's territorial awareness is getting increasingly strong, as a carrier with more privacy, mobile phones also need to have a function of preventing peeping, and thus privacy films were born. The privacy film is equivalent to that a privacy coating is added to a tempered film of the mobile phone, using micro louver optical technology. The principle of the micro louver optical technology is similar to louver in the office, and different look and feel can be achieved by angle adjustment. However, a design structure of the privacy film of the mobile phone is more dense, which can be understood as reducing louver by tens of thousands of times, and by controlling angles of lights, a viewing angle of a screen of the mobile phone is reduced.

However, there are also more inconveniences when the privacy film is attached. Others need to be in the same position as you in order to clearly see contents on the screen of the mobile phone. For example, when several people are watching the screen at the same time, due to a privacy feature of the screen, it is impossible for everyone to see contents on the screen at the same time, which affects the convenience of use.

SUMMARY

In order to solve the above technical problems, the present disclosure provides a privacy function structure, a display panel, and a display device.

In a first aspect, a privacy function structure is provided in the present disclosure. The privacy function structure includes a privacy state and a non-privacy state. The privacy function structure further includes a first conductive layer, a privacy liquid crystal layer disposed on a side of the first conductive layer, a light-transmitting cover plate disposed on a side of the privacy liquid crystal layer away from the first conductive layer, and a second conductive layer disposed on a side of the light-transmitting cover plate facing the first conductive layer. The second conductive layer includes multiple conductive strips mutually parallel. By controlling on and off of the multiple conductive strips, the privacy function structure is switched between the privacy state and the non-privacy state.

In another aspect, a display panel is provided in the present disclosure. The display panel includes a display layer and the privacy function structure that are stacked together. The first conductive layer is attached to the display layer.

In yet another aspect, a display device is provided in the present disclosure. The display device includes the display panel and a processor. The processor is electrically connected with the first conductive layer, the second conductive layer, and the display panel.

BRIEF DESCRIPTION OF THE DRAWINGS

To illustrate technical solutions in embodiments of the present disclosure more clearly, the following will briefly introduce accompanying drawings required for describing the embodiments. Apparently, the accompanying drawings in the following description merely illustrate some embodiments of the present disclosure. Those of ordinary skill in the art may also obtain other accompanying drawings based on these accompanying drawings without creative efforts.

DETAILED DESCRIPTION

The technical solutions in embodiments of the present disclosure will be clearly and completely illustrated in the following with reference to accompanying drawings in the embodiments of the present disclosure. Apparently, the described embodiments are merely a part of rather than all the embodiments of the present disclosure. All other embodiments obtained by those of ordinary skill in the art based on the embodiments of the present disclosure without creative efforts are within the scope of the present disclosure.

Figure 1:
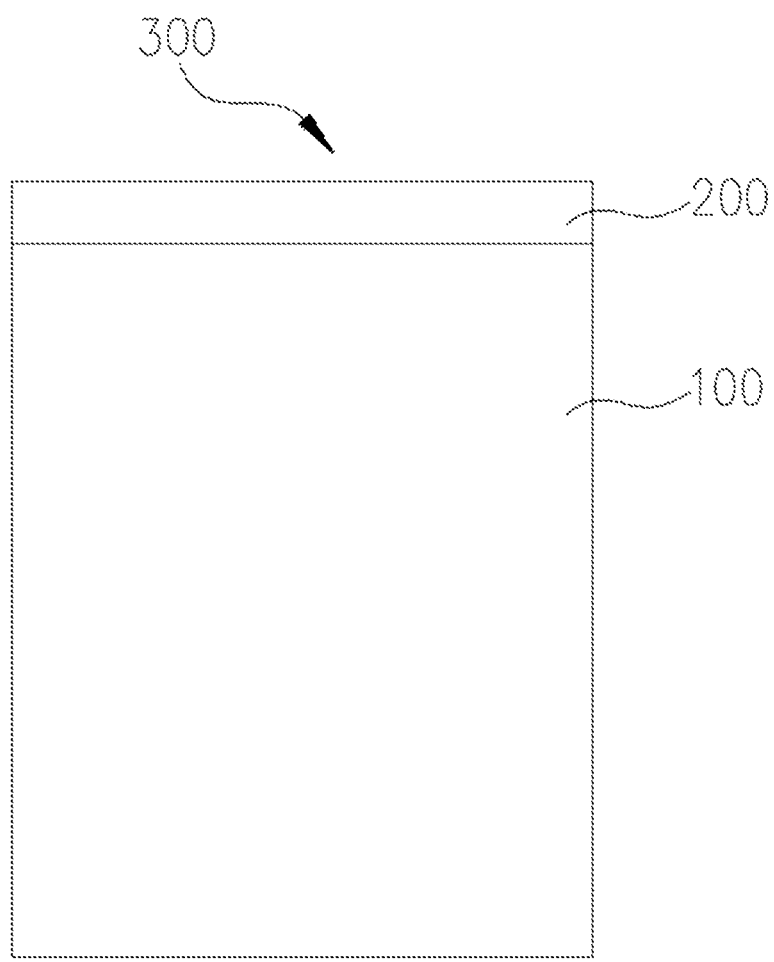
FIG. 1 is a schematic view of a display device provided in embodiments of the present disclosure.

Refer to FIG. 1, which is a schematic view of a display device provided in embodiments of the present disclosure.

A display device 300 includes a display panel 100 and a processor 200. The processor 200 is electrically connected with the display panel 100. The processor 200 is electrically connected with the display panel 100 to control the display panel 100.

Figure 2:
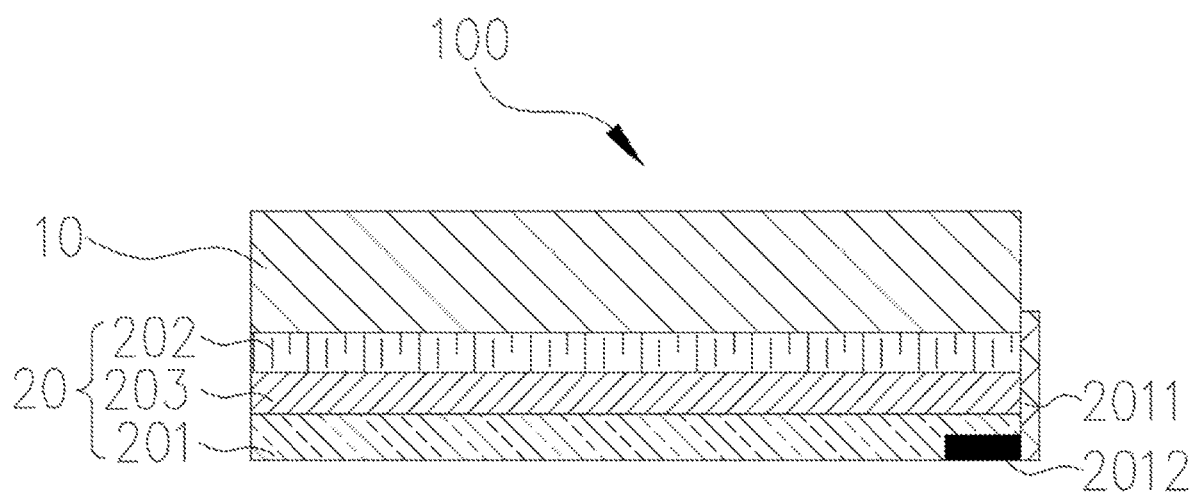
FIG. 2 is a cross-sectional view of a display panel provided in embodiments of the present disclosure.

Refer to FIG. 2, which is a cross-sectional view of a display panel provided in implementations of the present disclosure.

The display panel 100 includes a privacy function structure 10 and a display layer 20, and the privacy function structure 10 and the display layer 20 are stacked together. The display layer 20 is used to display images. The privacy function structure 10 covers the display layer 20. The privacy function structure 10 is used for preventing peeping, so as to protect privacy of display contents on the display layer 20. The display layer 20 is electrically coupled with the processor 200, and the privacy function structure 10 is electrically coupled with the processor 200.

The privacy function structure 10 includes a privacy state and a non-privacy state. When the privacy function structure 10 is in the privacy state, display contents on the display layer 20 are visible from a viewing angle. The viewing angle is an angle from which display contents on the display layer 20 can be viewed by the user through the privacy function structure 10. When the privacy function structure 10 is in the non-privacy state, the privacy function structure 10 is similar to a light-transmitting glass. The privacy function structure 10 in the non-privacy state does not have a privacy function, and images displayed on the display layer 20 can be normally through the privacy function structure 10. The processor 200 is used to control the privacy function structure 10 to switch between the privacy state and the non-privacy state. In the embodiment, the privacy state includes a first privacy state and a second privacy state. When the privacy function structure 10 is in different privacy states, viewing angles of the privacy function structure 10 are different. The processor 200 is further configured to control the privacy function structure 10 to switch between different privacy states.

Taking a mobile phone as the display device 300 as an example, when a user needs to view a personal privacy interface in the mobile phone in a public place, the user can set the privacy function structure 10 in the mobile phone to the privacy state through the processor 200, so that the display layer 20 of the display panel 100 of the mobile phone is visible from a viewing angle. When the user needs to share interface information in the mobile phone, the user can set the privacy function structure 10 in the mobile phone to the non-privacy state through the processor 200, so that images on the display layer 20 of the display panel 100 of the mobile phone can be normally through the privacy function structure 10, and thus the display panel 100 of the mobile phone is visible to many people.

When the user needs to switch or set states of the privacy function structure 10, the user can make a trigger request through an application (APP), a mechanical button, etc., and the processor 200 can control state switch of the privacy function structure 10 according to the user's trigger request, such as switch from the privacy state to the non-privacy state, or switch from the non-privacy state to the privacy state. It can be understood that in the privacy state, the user can control the privacy function structure 10 of the mobile phone through the processor 200 to switch between the first privacy state and the second privacy state. A viewing angle of the display panel 100 in the first privacy state is different from a viewing angle of the display panel 100 in the second privacy state, so that the user can control contents displayed on the display panel 100 in different angle ranges.

Optionally, the display device 300 includes, but is not limited to, a device with a luminous display effect such as a mobile phone, a computer, a television, or a smart wearable device.

Specifically, referring to FIG. 2, the display layer 20 includes an array substrate 201, a color filter substrate 202, and a color-mixing liquid crystal layer 203. The color-mixing liquid crystal layer 203 is sandwiched between the array substrate 201 and the color filter substrate 202, and the color-mixing liquid crystal layer 203 is used for controlling color-mixing display of the display layer 20. The array substrate 201 is provided with a conductive adhesive layer 2011 and a common electrode 2012. The conductive adhesive layer 2011 is connected between the privacy function structure 10 and the common electrode 2012, so that a cross-layer electrical connection between the privacy function structure 10 and the common electrode 2012 is achieved. It is to be understood that the cross-layer electrical connection refers to that the connection between the privacy function structure 10 and the common electrode 2012 of the array substrate 201 goes across the color filter substrate 202 and the color-mixing liquid crystal layer 203.

The common electrode 2012 is used for introducing stable electrical signals. On the one hand, stable electrical signals are introduced into one side of the privacy function structure 10, thereby forming a stable voltage. On the other hand, the influence of an external electric field is shielded, so that the display stability of the color-mixing liquid crystal layer 203 is better.

Optionally, the material of the conductive adhesive layer 2011 includes but is not limited to other conductive materials such as silver adhesive.

Figure 3:
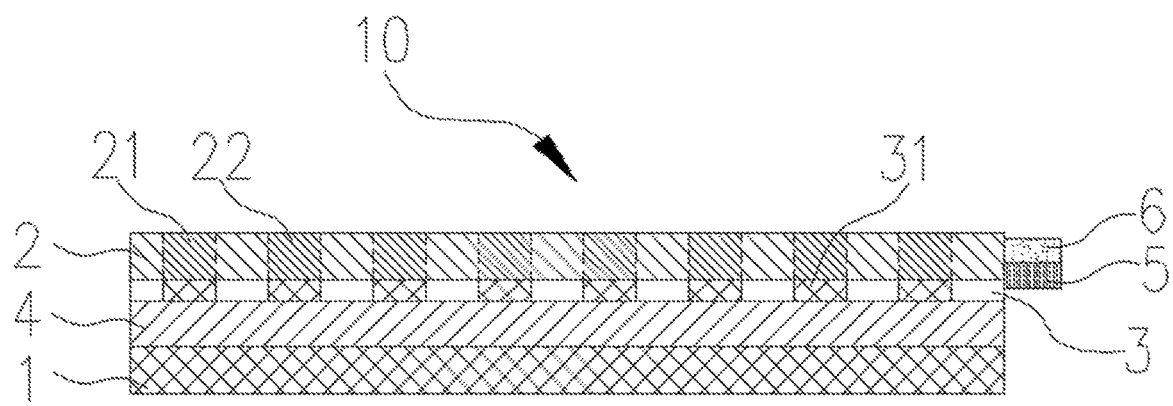
FIG. 3 is a cross-sectional view of a privacy function structure provided in embodiments of the present disclosure.
Figure 4:
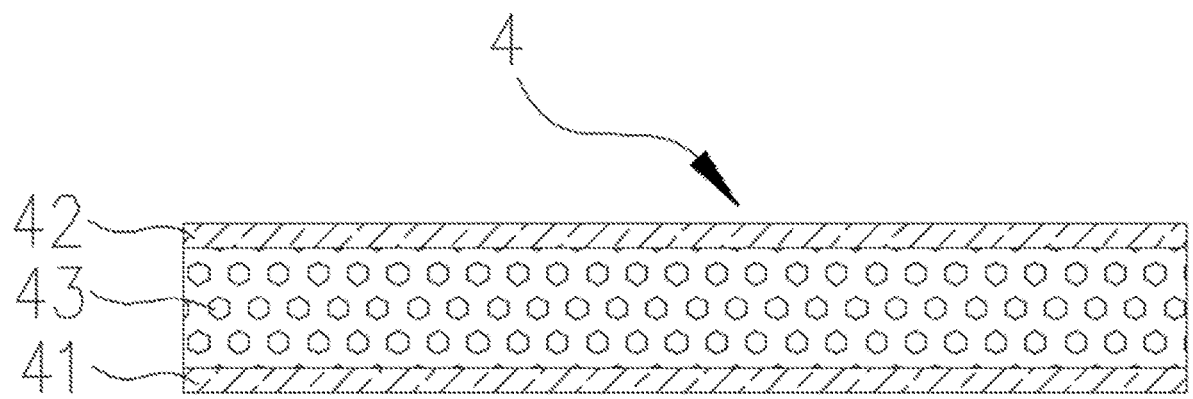
FIG. 4 is a cross-sectional view of a privacy liquid crystal layer provided in embodiments of the present disclosure.

Referring to FIG. 3 and FIG. 4, FIG. 3 is a cross-sectional view of a privacy function structure provided in embodiments of the present disclosure, and FIG. 4 is a cross-sectional view of a privacy liquid crystal layer provided in embodiments of the present disclosure.

The privacy function structure 10 includes a first conductive layer 1, a light-transmitting cover plate 2, a second conductive layer 3, a privacy liquid crystal layer 4, a control circuit 5, and a feedback circuit 6.

The first conductive layer 1 is disposed opposite to the light-transmitting cover plate 2, and the second conductive layer 3 is disposed on one side of the light-transmitting cover plate 2 facing the first conductive layer 1. The first conductive layer 1 is spaced apart from the second conductive layer 3, and the privacy liquid crystal layer 4 is sandwiched between the first conductive layer 1 and the second conductive layer 3.

The control circuit 5 is electrically connected with the processor 200. The control circuit 5 is electrically connected with the second conductive layer 3, and the control circuit 5 is configured to control on and off of electrical signals on multiple conductive strips 31 disposed on the second conductive layer 3, respectively. When the processor 200 receives a user's trigger request, the control circuit 5 controls on and off of electrical signals on each conductive strip 31, so that the privacy function structure 10 switches to a corresponding state.

The feedback circuit 6 is electrically connected between the processor 200 and the second conductive layer 3, and the feedback circuit 6 is configured to monitor electrical signals on the multiple conductive strips 31 on the second conductive layer 3, and feed back on and off of the multiple conductive strips 31 on the second conductive layer 3 to the processor 200. When the feedback circuit 6 detects that all the conductive strips 31 are energized or only part of the conductive strips 31 are energized, the processor 200 can generate different viewing angle information of the privacy function structure 10 in the privacy state. By means of the feedback circuit 6, viewing angles of the privacy function structure 10 in the privacy state can be monitored.

In other embodiments, the control circuit 5 and the feedback circuit 6 may be arranged in the processor 200.

Specifically, the privacy liquid crystal layer 4 includes a first alignment film 41, a second alignment film 42, and privacy liquid crystal molecules 43, and the privacy liquid crystal molecules 43 are sandwiched between the first alignment film 41 and the second alignment film 42. The first alignment film 41 is arranged on one side of the privacy liquid crystal layer 4 close to the first conductive layer 1, the second alignment film 42 is arranged on one side of the privacy liquid crystal layer 4 close to the second conductive layer 3, and the first alignment film 41 and the second alignment film 42 are used for anchoring the privacy liquid crystal molecules 43, so that the liquid crystal molecules 43 are at a fixed deflection angle, and the privacy liquid crystal layer 4 formed can transmit light.

In this embodiment, the first conductive layer 1 is made from indium tin oxide (ITO). The first conductive layer 1 is disposed on one side of the color filter substrate 202 away from the color-mixing liquid crystal layer 203. The first conductive layer 1 is in the shape of a thin film. The first conductive layer 1 can carry electrical signals. The first conductive layer 1 is electrically connected with the common electrode 2012 through the conductive adhesive layer 2011, and stable electrical signals are introduced to the first conductive layer 1 through the common electrode 2012 to form a stable voltage on the first conductive layer 1.

In the embodiment, the second conductive layer 3 may be made from ITO, the second conductive layer 3 is disposed on one side of the light-transmitting cover plate 2 close to the privacy liquid crystal layer 4, and the second conductive layer 3 includes the multiple conductive strips 31 arranged at intervals, the conductive strips 31 are in the shape of a vertical strip, and the conductive strips 31 can carry electrical signals.

Specifically, the multiple conductive strips 31 are arranged at intervals, and distances between adjacent conductive strips 31 are equal. The distances between adjacent conductive strips 31 are equal, so that the liquid crystal molecules 43 in the privacy liquid crystal layer 4 are evenly deflected, thereby improving the stability of the privacy liquid crystal layer 4, and accordingly improving the display effect of the privacy function structure 10. Electrical signals on the conductive strips 31 are equal in magnitude, and directions of electrical signals on adjacent conductive strips 31 are opposite. Electrical signals on the conductive strips 31 are set to have equal magnitudes, so that the liquid crystal molecules 43 in the privacy liquid crystal layer 4 are evenly deflected, thereby improving the stability of the privacy liquid crystal layer 4, and accordingly improving the display effect of the privacy function structure 10. Directions of electrical signals on adjacent conductive strips 31 are set to be opposite, so that an electric field in a first direction is formed between adjacent conductive strips 31, thereby reducing influence of the conductive strips 31 on the deflection of the liquid crystal molecules 43 in a light-transmitting portion, improving the light transmittance performance of the privacy liquid crystal layer 4, and accordingly improving the display effect of the privacy function structure 10.

In other embodiments, the first conductive layer 1 and the second conductive layer 3 may be made from other conductive materials.

Figure 5:
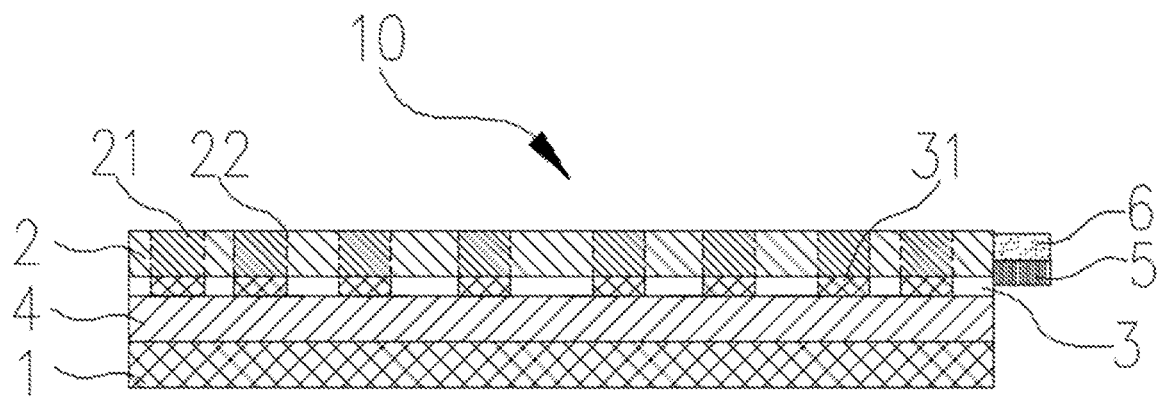
FIG. 5 is another cross-sectional view of a privacy function structure provided in embodiments of the present disclosure.

In other embodiments, refer to FIG. 5, which is a cross-sectional view of another privacy function structure provided in embodiments of the present disclosure. The privacy function structure 10 illustrated in FIG. 5 is substantially the same as the privacy function structure 10 illustrated in FIG. 3, and the difference is that in the privacy function structure 10 illustrated in FIG. 5 the multiple conductive strips 31 are not evenly arranged.

Specifically, among the conductive strips 31, a distance between two adjacent conductive strips 31 near the middle of the light-transmitting cover plate 2 is larger than a distance between two adjacent conductive strips 31 near an edge of the light-transmitting cover plate 2. In other words, from two adjacent conductive strips 31 near the middle of the light-transmitting cover plate 2 to two adjacent conductive strips 31 near the edge of the light-transmitting cover plate 2 a decreasing form is presented. Since the distance between two adjacent conductive strips 31 near the middle of the light-transmitting cover plate 2 is greater than the distance between two adjacent conductive strips 31 near the edge of the light-transmitting cover plate 2, a viewing angle at the edge of the light-transmitting cover plate 2 is reduced, so that the privacy function structure10 has a relatively good privacy effect.

The privacy state and the non-privacy state of the privacy function structure 10 are further elaborated below.

Figure 6:
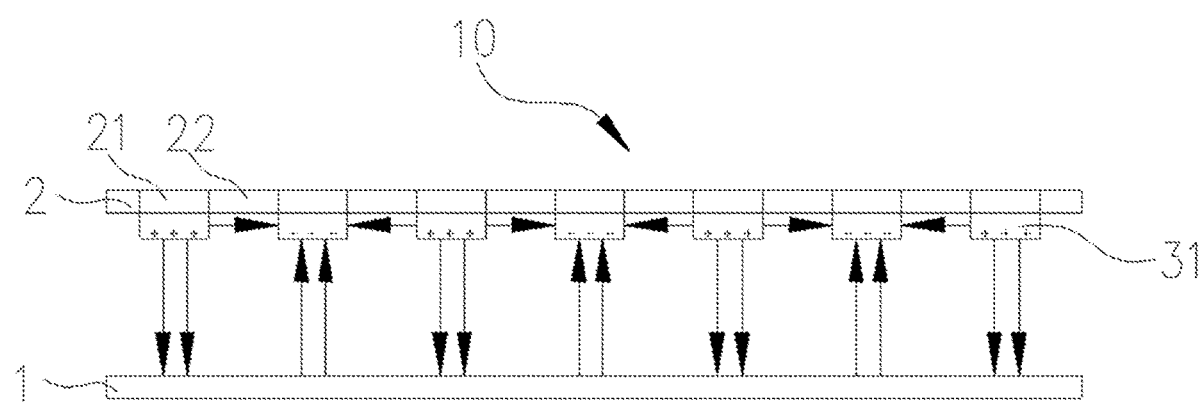
FIG. 6 is an electric field distribution diagram of a privacy function structure in a privacy state provided in embodiments of the present disclosure.

Refer to FIG. 6, which is an electric field distribution diagram of a privacy function structure in a privacy state provided in embodiments of the present disclosure.

When the privacy function structure 10 is in the privacy state, the control circuit 5 controls the conductive strips 31 on the second conductive layer 3 and makes at least one conductive strip 31 energized. An electric field in a first direction (direction indicated by a vertical arrow illustrated in FIG. 6) is formed between the at least one conductive strip 31 and the first conductive layer 1, so that liquid crystals between the at least one conductive strip 31 energized and the first conductive layer 1 cannot transmit light.

Specifically, the light-transmitting cover plate 2 includes first regions 21 and second regions 22, the number of the first regions 21 is multiple, the conductive strips 31 are disposed corresponding to the first regions 21, and the conductive strips 31 cover the first regions 21, respectively. One second region 22 is arranged between each two adjacent first regions 21, and the second region 22 corresponds to a gap between two adjacent conductive strips 31.

Figure 7:
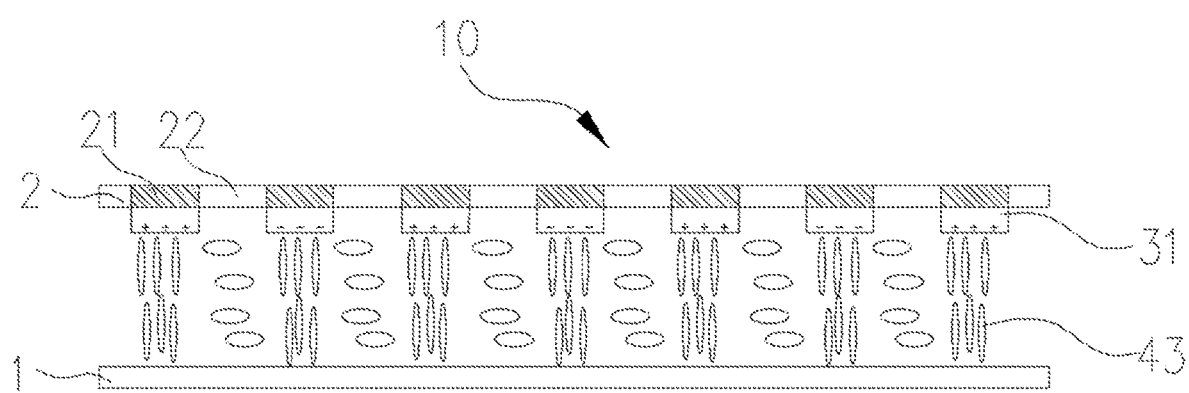
FIG. 7 is a schematic view of a privacy function structure in a first privacy state provided in embodiments of the present disclosure.
Figure 8:
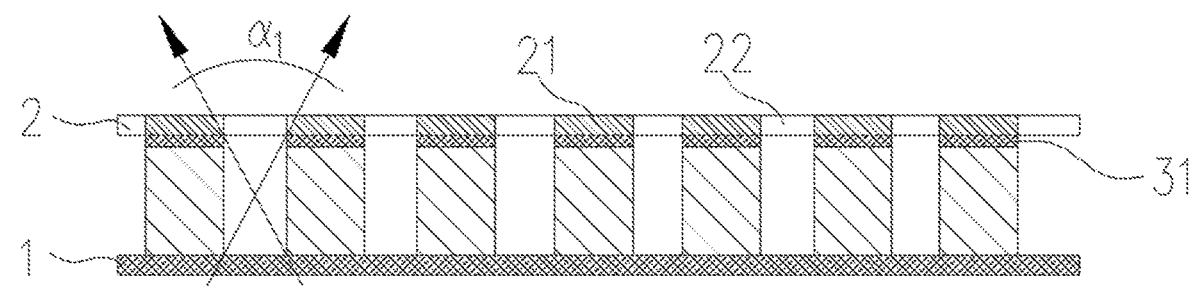
FIG. 8 is a schematic view illustrating light transmission of a privacy function structure in a first privacy state provided in embodiments of the present disclosure.

Referring to FIG. 7 and FIG. 8, FIG. 7 is a schematic view of a privacy function structure in a first privacy state provided in embodiments of the present disclosure, and FIG. 8 is a schematic view illustrating light transmission of a privacy function structure in a first privacy state provided in embodiments of the present disclosure.

On and off of different conductive strips 31 are controlled by the control circuit 5, so that the privacy function structure 10 can switch between different privacy states.

The control circuit 5 controls each conductive strip 31 to be energized, and electrical signals on each two adjacent conductive strips 31 are equal in magnitude and opposite in direction, and the privacy function structure 10 is in the first privacy state. The electric field in the first direction is formed between each of the conductive strips 31 and the first conductive layer 1, and an electric field in a second direction (direction indicated by a horizontal arrow illustrated in FIG.

6) is formed between each two adjacent conductive strips 31 because directions of electrical signals are opposite.

In the privacy liquid crystal layer 4, the liquid crystal molecules 43 in the electric field in the first direction cannot transmit light, and the liquid crystal molecules 43 in the electric field in the second direction can transmit light. In other words, the liquid crystal molecules 43 corresponding to the first regions 21 cannot transmit light, and the liquid crystal molecules 43 corresponding to the second regions 22 can transmit light.

When the privacy function structure 10 is in the first privacy state, only the second regions 22 of the privacy function structure 10 (i.e., gaps between adjacent conductive strips 31) can transmit light, and a viewing angle of the privacy function structure 10 is α1, which is convenient for a user to view a privacy interface, and the user can adjust through the feedback circuit 6 the degree of privacy protection of the privacy function structure 10 according to the importance of the privacy interface. The degree of privacy protection is a deflection angle of the liquid crystal molecules 43. When the feedback circuit 6 controls electrical signals on the conductive strips 31 to be relatively large, the deflection angle of the liquid crystal molecules 43 in this region is relatively large, and light transmittance performance of the liquid crystal molecules 43 in this region is relatively poor. When the feedback circuit 6 controls electrical signals on the conductive strips 31 to be relatively small, the deflection angle of the liquid crystal molecules 43 in this region is relatively small, and the light transmittance performance of the liquid crystal molecules 43 in this region is relatively good. It is to be understood that good light transmittance performance and poor light transmittance performance refer to the light transmittance of the liquid crystal molecules 43. Good light transmittance performance refers to that the light transmittance of the liquid crystal molecules 43 in this region is high, and poor light transmittance performance refers to that the light transmittance of the liquid crystal molecules 43 in this region is low.

Figure 9:
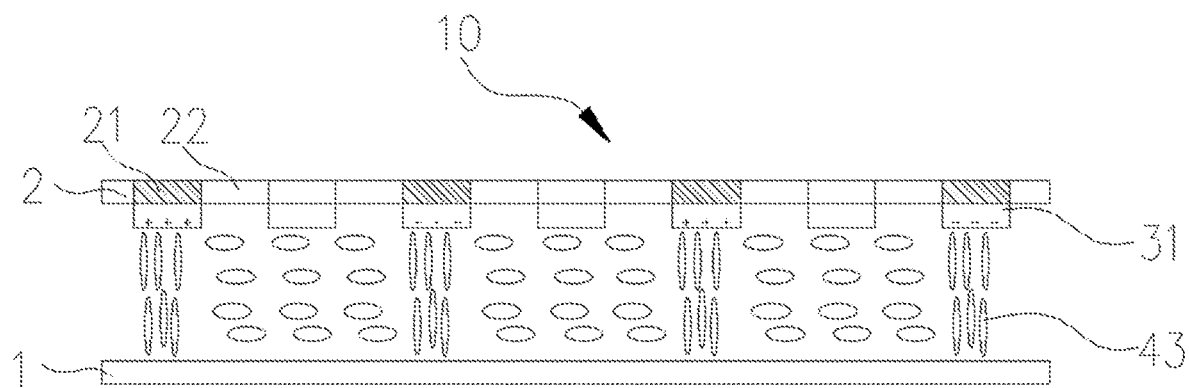
FIG. 9 is a schematic view of a first privacy function structure in a second privacy state provided in embodiments of the present disclosure.
Figure 10:
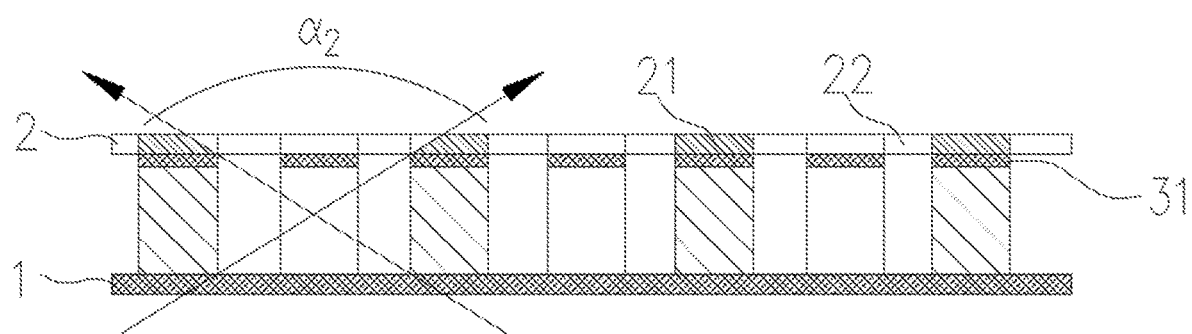
FIG. 10 is a schematic view illustrating light transmission of a first privacy function structure in a second privacy state provided in embodiments of the present disclosure.
Figure 11:
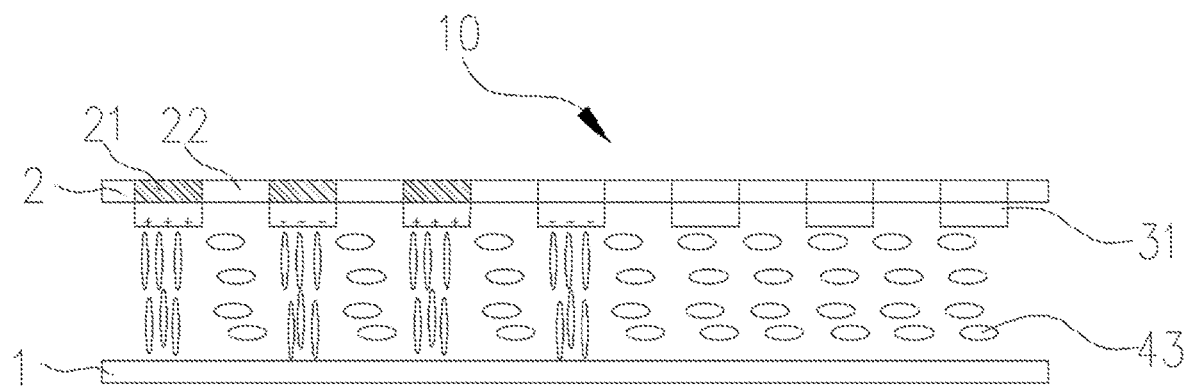
FIG. 11 is a schematic view of a second privacy function structure in a second privacy state provided in embodiments of the present disclosure.
Figure 12:
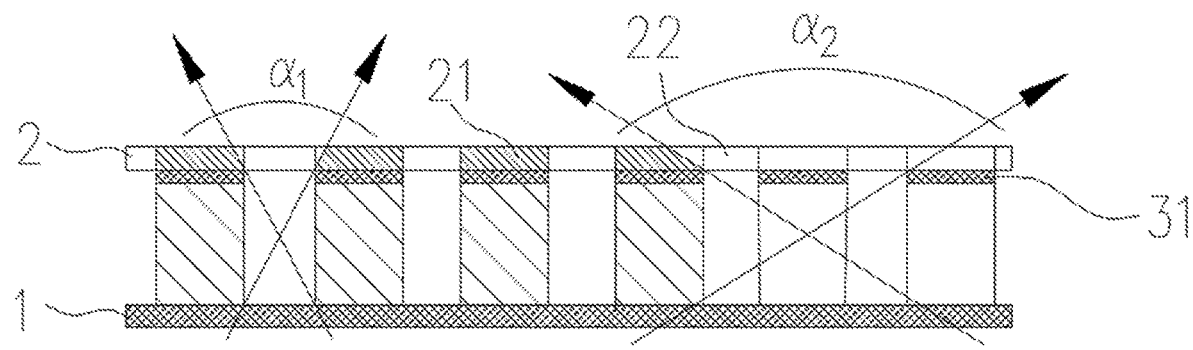
FIG. 12 is a schematic view illustrating light transmission of a second privacy function structure in a second privacy state provided in embodiments of the present disclosure.

Referring to FIG. 9, FIG. 10, FIG. 11, and FIG. 12, FIG. 9 is a schematic view of a first privacy function structure in a second privacy state provided in implementations of the present disclosure, FIG. 10 is a schematic view illustrating light transmission of a first privacy function structure in a second privacy state provided in embodiments of the present disclosure, FIG. 11 is a schematic view of a second privacy function structure in a second privacy state provided in embodiments of the present disclosure, and FIG. 12 is a schematic view illustrating light transmission of a second privacy function structure in a second privacy state provided in implementations of the present disclosure.

In the second privacy state, the control circuit 5 controls part of the conductive strips 31 to be energized, electrical signals on the conductive strips 31 energized are equal in magnitude, and electrical signals on each two adjacent conductive strips 31 energized are opposite in direction. An electric field in a first direction is formed between the conductive strips 31 energized and the first conductive layer 1, and an electric field in a second direction is formed between each two adjacent conductive strips 31 energized.

In the privacy liquid crystal layer 4, the liquid crystal molecules 43 in the electric field in the first direction cannot transmit light, and the liquid crystal molecules 43 in the electric field in the second direction can transmit light. In other words, the liquid crystal molecules 43 corresponding to the first regions 21 corresponding to conductive strips 31 energized cannot transmit light, and the liquid crystal molecules 43 corresponding to the first regions 21 corresponding to conductive strips de-energized can transmit light, and the liquid crystal molecules 43 corresponding to the second regions 22 can transmit light.

When the privacy function structure 10 is in the second privacy state, part of the first regions 21 and all the second regions 22 of the privacy function structure 10 can transmit light, and a viewing angle of the privacy function structure 10 in the second privacy state is α2, and α2>α1.

Referring to FIG. 3, FIG. 9, and FIG. 10, in a first embodiment, the control circuit 5 controls the conductive strips 31 to be energized every other conductive strip, that is, an energized conductive strip 31, a de-energized conductive strip 31, an energized conductive strip 31, a de-energized conductive strip 31 . . . are arranged at intervals in sequence. A viewing angle of the privacy function structure 10 in the first embodiment is α2, and α2>α1. The liquid crystal molecules 43 in the privacy liquid crystal layer 4 are evenly deflected, so that the display effect of the privacy function structure 10 is more uniform.

Referring to FIG. 3, FIG. 11, and FIG. 12, in a second embodiment, the control circuit 5 controls some adjacent conductive strips 31 to be energized, and controls other adjacent conductive strips 31 to be de-energized, that is, an energized conductive strip 31, an energized conductive strips 31, an energized conductive strips 31, . . . , a de-energized conductive strip 31, a de-energized conductive strip 31, a de-energized conductive strip 31 . . . are arranged at intervals in sequence. In the second embodiment, viewing angles of the privacy function structure 10 are different in different regions, that is, the viewing angles include α1 and α2, which is helpful for the user to selectively control a viewing angle of some regions of the privacy function structure 10 to be α2 and a viewing angle of other regions of the privacy function structure 10 to be α1. For the privacy function structure 10 in the second embodiment, it is beneficial for the user to adjust viewing angles of the privacy function structure 10 in different regions in the privacy state, thereby improving user's experience.

It can be understood that the user can control through the processor 200 different regions of the privacy function structure 10 to present different light transmission effects, thereby realizing that different regions of the display panel 100 of the mobile phone correspond to different display states by adjustment. For example, the privacy function structure 10 includes a visible region and an invisible region. Generally, at the top of the display panel 100, interfaces including personal privacy such as text messages, messages, and notifications are popped up. The user can set the top of the display panel 100 of the mobile phone to correspond to the invisible region of the privacy function structure 10, and set other parts of the display panel 100 to correspond to the visible region of the privacy function structure 10, so that users can share interfaces that need to be shared while protecting their privacy.

Figure 13:
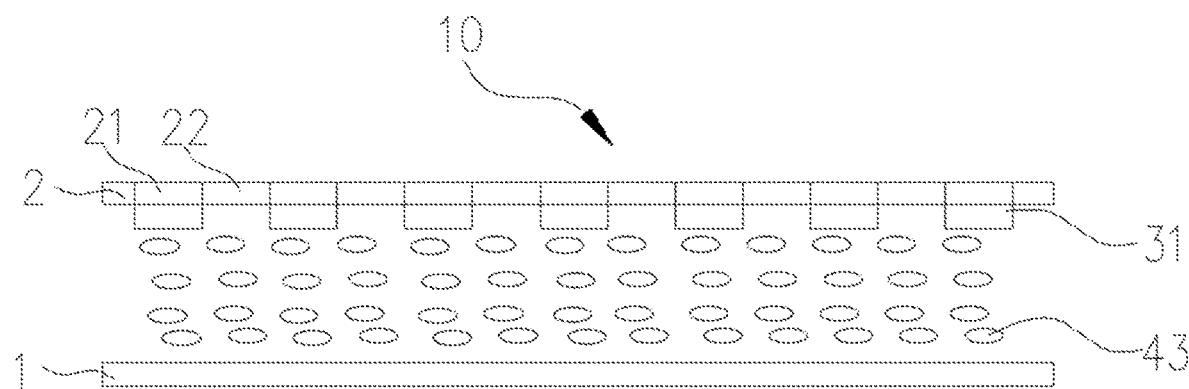
FIG. 13 is a schematic view of a privacy function structure in a non-privacy state provided in embodiments of the present disclosure.
Figure 14:
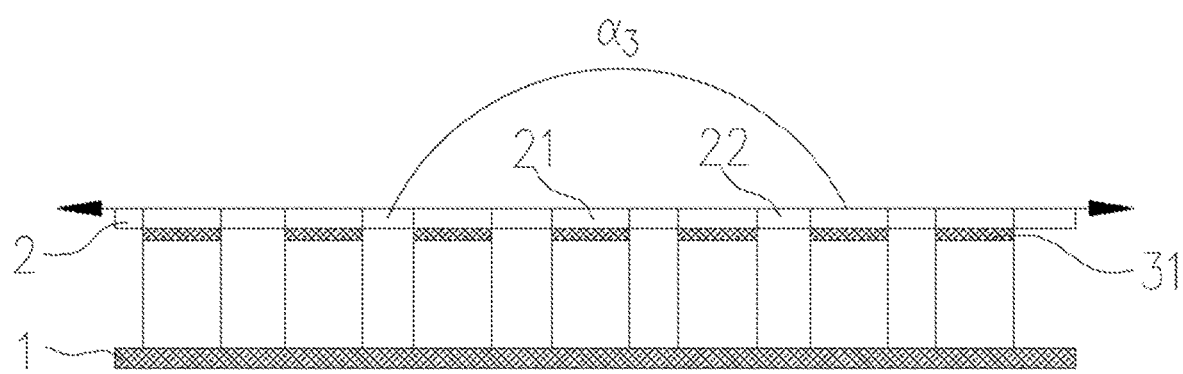
FIG. 14 is a schematic view illustrating light transmission of a privacy function structure in a non-privacy state provided in embodiments of the present disclosure.

Referring to FIG. 13 and FIG. 14, FIG. 13 is a schematic view of a privacy function structure in a non-privacy state provided in embodiments of the present disclosure, and FIG. 14 is a schematic view illustrating light transmission of a privacy function structure in a non-privacy state provided in embodiments of the present disclosure.

When the privacy function structure 10 is in the non-privacy state, the control circuit 5 controls the conductive strips 31 on the second conductive layer 3 and makes each conductive strip 31 be de-energized. All the liquid crystal molecules 43 in the privacy liquid crystal layer 4 can transmit light. At this point, the privacy function structure 10 is similar to an ordinary light-transmitting glass and is in the non-privacy state.

In the privacy function structure 10, the display panel 100, and the display device 300 provided in embodiments of the present disclosure, the user can control through the control circuit 5 on and off of electrical signals on the conductive strips 31 on the second conductive layer 3, so that the privacy function structure 10 can switch between the privacy state and the non-privacy state. The user can also control through the control circuit 5 on and off of electrical signals on part of the conductive strips 31 on the second conductive layer 3, so that the privacy function structure 10 can switch between the first privacy state and the second privacy state in the privacy state.

The above are some embodiments of the present disclosure. It is to be pointed out that for those of ordinary skill in the art, some improvements and modifications can be made without departing from the principles of the present disclosure, and these improvements and modifications are also regarded as a scope of protection of the present disclosure.

What is claimed is:

1. A privacy function structure comprising a privacy state and a non-privacy state, the privacy function structure further comprising:
   a first conductive layer;
   a privacy liquid crystal layer disposed on a side of the first conductive layer;
   a light-transmitting cover plate disposed on a side of the privacy liquid crystal layer away from the first conductive layer; and
   a second conductive layer disposed on a side of the light-transmitting cover plate facing the first conductive layer, the second conductive layer comprising a plurality of conductive strips mutually parallel; wherein each two adjacent conductive strips form a gap, and when the privacy function structure is in the privacy state, directions of electrical signals on each two adjacent conductive strips energized are opposite; wherein
   the light-transmitting cover plate comprises first regions and second regions, wherein one second region is arranged between each two adjacent first regions, and each of the plurality of conductive strips covers a corresponding first region;
   when all the plurality of conductive strips are de-energized, the privacy liquid crystal layer corresponding to the first regions transmits light, the privacy liquid crystal layer corresponding to the second regions transmits light, and the privacy function structure is in the non-privacy state;
   when at least one conductive strip is energized, the at least one conductive strip energized and the first conductive layer form a vertical electric field, so that the privacy liquid crystal layer corresponding to at least one first region where the at least one conductive strip energized is located fails to transmit light, and the privacy function structure is in the privacy state; and
   by controlling on and off of the plurality of conductive strips, the privacy function structure is switched between the privacy state and the non-privacy state.

2. The privacy function structure of claim 1, further comprising a control circuit, wherein the control circuit is electrically connected with each of the plurality of conductive strips on the second conductive layer, so as to control on and off of electrical signals on the plurality of conductive strips, respectively.

3. The privacy function structure of claim 2, wherein the privacy state comprises a first privacy state and a second privacy state with different viewing angles, wherein in the first privacy state, each of the plurality of conductive strips is energized, and in the second privacy state, only one conductive strip in any two adjacent conductive strips is energized.

4. A display panel comprising:
   a display layer; and
   a privacy function structure disposed on the display layer and comprising:
   a first conductive layer attached to the display layer;
   a privacy liquid crystal layer disposed on a side of the first conductive layer;
   a light-transmitting cover plate disposed on a side of the privacy liquid crystal layer away from the first conductive layer; and
   a second conductive layer disposed on a side of the light-transmitting cover plate facing the first conductive layer, the second conductive layer comprising a plurality of conductive strips mutually parallel; wherein each two adjacent conductive strips form a gap, and when the privacy function structure is in the privacy state, directions of electrical signals on each two adjacent conductive strips energized are opposite; wherein
   the light-transmitting cover plate comprises first regions and second regions, wherein one second region is arranged between each two adjacent first regions, and each of the plurality of conductive strips covers a corresponding first region;
   when all the plurality of conductive strips are de-energized, the privacy liquid crystal layer corresponding to the first regions transmits light, the privacy liquid crystal layer corresponding to the second regions transmits light, and the privacy function structure is in the non-privacy state;
   when at least one conductive strip is energized, the at least one conductive strip energized and the first conductive layer form a vertical electric field, so that the privacy liquid crystal layer corresponding to at least one first region where the at least one conductive strip energized is located fails to transmit light, and the privacy function structure is in the privacy state; and
   by controlling on and off of the plurality of conductive strips, the privacy function structure is switched between the privacy state and the non-privacy state.

5. The display panel of claim 4, wherein the display layer comprises an array substrate, a color filter substrate, and a color-mixing liquid crystal layer, wherein the color-mixing liquid crystal layer is sandwiched between the array substrate and the color filter substrate, and the first conductive layer is disposed on a side of the color filter substrate away from the array substrate.

6. The display panel of claim 5, wherein the array substrate comprises a common electrode electrically connected with the first conductive layer.

7. The display panel of claim 6, wherein the array substrate further comprises a conductive adhesive layer electrically connected between the first conductive layer and the common electrode.

8. The display panel of claim 4, wherein the privacy function structure further comprises a control circuit, wherein the control circuit is electrically connected with each of the plurality of conductive strips on the second conductive layer, so as to control on and off of electrical signals on the plurality of conductive strips, respectively.

9. The display panel of claim 8, wherein
the privacy state comprises a first privacy state and a second privacy state with different viewing angles, wherein in the first privacy state, each of the plurality of conductive strips is energized, and in the second privacy state, only one conductive strip in any two adjacent conductive strips is energized.

10. A display device comprising:
a processor; and
a display panel electrically connected with the processor and comprising:
a display layer electrically connected with the processor; and
a privacy function structure comprising:
a first conductive layer attached to the display layer and electrically connected with the processor;
a privacy liquid crystal layer disposed on a side of the first conductive layer;
a light-transmitting cover plate disposed on a side of the privacy liquid crystal layer away from the first conductive layer; and
a second conductive layer disposed on a side of the light-transmitting cover plate facing the first conductive layer and electrically connected with the processor, the second conductive layer comprising a plurality of conductive strips mutually parallel; wherein each two adjacent conductive strips form a gap, and when the privacy function structure is in the privacy state, directions of electrical signals on each two adjacent conductive strips energized are opposite; wherein
the light-transmitting cover plate comprises first regions and second regions, wherein one second region is arranged between each two adjacent first regions, and each of the plurality of conductive strips covers a corresponding first region;
when all the plurality of conductive strips are de-energized, the privacy liquid crystal layer corresponding to the first regions transmits light, the privacy liquid crystal layer corresponding to the second regions transmits light, and the privacy function structure is in the non-privacy state;
when at least one conductive strip is energized, the at least one conductive strip energized and the first conductive layer form a vertical electric field, so that the privacy liquid crystal layer corresponding to at least one first region where the at least one conductive strip energized is located fails to transmit light, and the privacy function structure is in the privacy state; and
by controlling on and off of the plurality of conductive strips, the privacy function structure is switched between the privacy state and the non-privacy state.

11. The display device of claim 10, wherein
the privacy function structure further comprises a control circuit, wherein the control circuit is electrically connected with each of the plurality of conductive strips on the second conductive layer, so as to control on and off of electrical signals on the plurality of conductive strips, respectively.

12. The display device of claim 11, wherein
the privacy state comprises a first privacy state and a second privacy state with different viewing angles, wherein in the first privacy state, each of the plurality of conductive strips is energized, and in the second privacy state, only one conductive strip in any two adjacent conductive strips is energized.

* * * * *